United States Patent [19]
Stempfer

[11] Patent Number: 6,013,891
[45] Date of Patent: Jan. 11, 2000

[54] WELDING APPARATUS AND WELDING METHOD, PARTICULARLY RESISTANCE WELDING METHOD

[75] Inventor: Ferdinand Stempfer, Hollabrunn, Austria

[73] Assignee: PROTEC Produktion Techn. Gerate GmbH, Vienna, Austria

[21] Appl. No.: 08/936,594

[22] Filed: Sep. 24, 1997

[30] Foreign Application Priority Data

Sep. 25, 1996 [AT] Austria ..................................... 1704/96

[51] Int. Cl.⁷ ................................................. B23K 11/24
[52] U.S. Cl. .......................................... 219/110; 219/113
[58] Field of Search ................................... 219/113, 108, 219/109, 110

[56] References Cited

U.S. PATENT DOCUMENTS

| | | |
|---|---|---|
| 2,472,110 | 6/1949 | Klemperer . |
| 4,639,569 | 1/1987 | Dufrenne ................................. 219/109 |
| 4,709,132 | 11/1987 | Tengler et al. ......................... 219/110 |
| 4,973,815 | 11/1990 | Ito et al. ................................. 219/110 |
| 5,021,625 | 6/1991 | Destefan et al. ....................... 219/109 |
| 5,064,987 | 11/1991 | Braman .................................. 219/110 |
| 5,294,768 | 3/1994 | Breitmeier ............................. 219/113 |
| 5,570,254 | 10/1996 | Spilger et al. ....................... 219/130.32 |

FOREIGN PATENT DOCUMENTS

| | | |
|---|---|---|
| 0 570 678 A1 | 11/1993 | European Pat. Off. . |
| 2153692 | 5/1973 | France . |
| 48-24625 | 7/1973 | Japan ..................................... 219/113 |
| 59-218284 | 12/1984 | Japan . |
| 3-285777 | 12/1991 | Japan ..................................... 219/113 |

*Primary Examiner*—Clifford C. Shaw
*Attorney, Agent, or Firm*—Alston & Bird LLP

[57] ABSTRACT

The invention relates to a welding apparatus (1), particularly a resistance welding apparatus, comprising a control device (2), a charging device (10), at least one energy store (22 to 24), a switching device (33 to 35) and a consumer (51), the energy store (22 to 24) being incorporated in parallel with the charging device (10) and the said energy store being connected, via the switching device (33 to 35) associated therewith and a transfer device (31) subsequent thereto, to the consumer (51), particularly a welding torch (52) with a non-melting electrode (53) and a workpiece (54). A plurality of energy stores (22 to 24) are disposed each with an associated switching device (33 to 35), and the switching devices (33 to 35) of the energy stores (22 to 24) are triggered between two charging cycles by the control device (2) for directly successive emission of at least a portion of the energy stored in one of the energy stores (22 to 24) to the consumer (51).

14 Claims, 4 Drawing Sheets

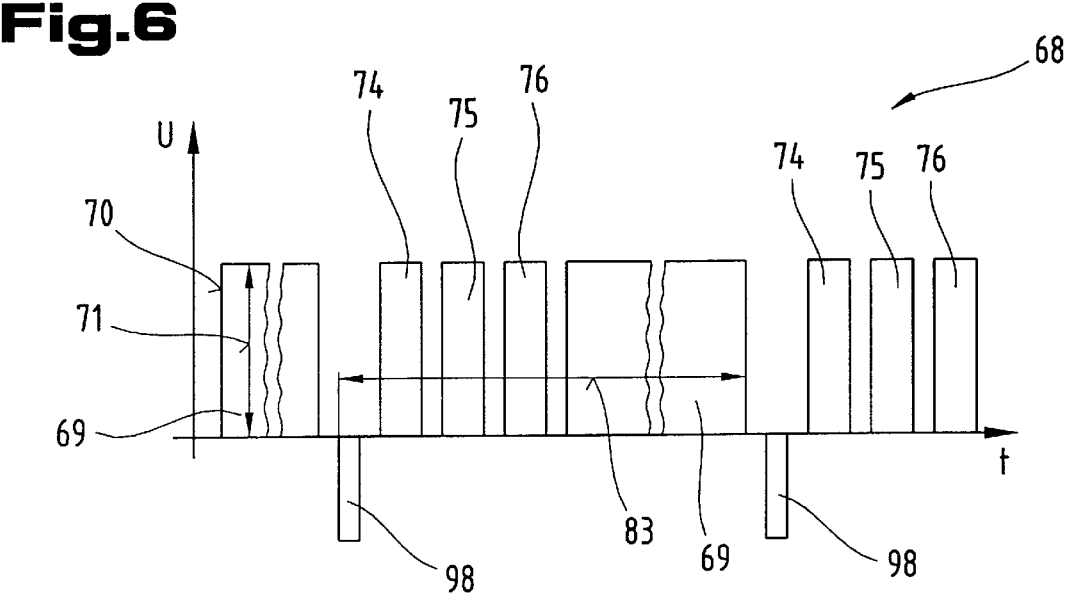
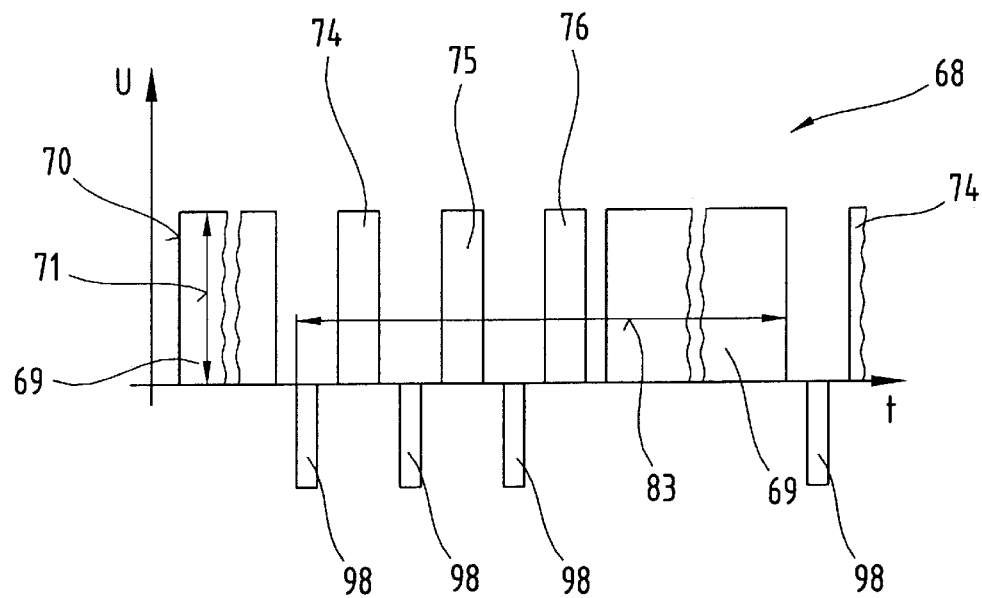

WELDING APPARATUS AND WELDING METHOD, PARTICULARLY RESISTANCE WELDING METHOD

BACKGROUND OF THE INVENTION

1. Field of the Invention

The invention relates to a welding apparatus and to a method for emitting a plurality of energy pulses to a consumer disposed on a welding point.

2. The Prior Art

Welding apparatus, especially resistance welding apparatus, is already known in which, by means of activating a switch device from a control device, the energy stored in an energy store is applied to a consumer. The energy pulse in this case can be freely adjusted in its amplitude and the time period of the length of the energy pulse, via an input and/or output device, by the user. After the energy pulse has been applied to the consumer, particularly on a welding torch with a non-melting electrode and a workpiece, the energy store is supplied with energy from a charging device, so that said energy store is charged to the corresponding value and a renewed welding process can be carried out. A disadvantage in such a welding apparatus is that due to an energy pulse only thin additive material, in particular thin steel sheets or a relatively fine-grained metal powder, can be used, as charging must firstly be carried out between the emission of two energy pulses from the energy store, so that during this period the additive material cools intensely and thus the additive material is always melted over only a specific thickness.

SUMMARY OF THE INVENTION

The object underlying the present invention is to provide a welding apparatus, particularly a resistance welding apparatus, and a method for emitting a plurality of energy pulses to a consumer disposed at a welding point, in which an at least identical welding quality can be achieved through the varying thicknesses of the materials to be welded.

This object of the invention is achieved by the welding apparatus, wherein a plurality of energy stores are arranged, each with an associated switch device, and the switching devices of the energy stores are triggered between two charging cycles by the control device for directly successive emission of at least a portion of the energy stored in each of the energy stores, to the consumer. An advantage in this respect is that, due to a plurality of successive energy pulses within one welding process, a substantially greater melting of the additive material is achieved, so that a substantially thicker additive material, or coarser-grained metal powder, can be used. A further, unforeseen advantage resides in the fact that, due to the emission of a plurality of successive energy pulses, exact control of the configuration of a welding process can be carried out, so that the weld quality is substantially increased in such a resistance welding apparatus.

In other embodiments each respective energy store has its own charging device or each energy store may be connected independently of the other energy stores via a switching device to the charging device. The advantage of these designs is that in this way charging of the energy store can be carried out and adjusted independently of one another and thus different energy pulses can be applied to the consumer.

In a further embodiment an input and/or output device is connected to the control device of the welding apparatus. In this way an adaptation to the most varied additive materials or metal powders can be carried out.

An further advantage of the welding apparatus is that the charging device is connected, with an interposed filter arrangement, to a voltage source, particularly a public mains voltage supply, as in this way constructive units belonging to prior art can be used, so that costs can be saved in manufacturing the welding apparatus.

An advantageous design is characterized in that a starting switch is connected to the control device in order to activate a welding procedure, as in this way a welding process can be carried out at a defined point in time.

In further embodiments a sensor device is disposed between the welding torch and the transfer device or the sensor device is formed for example by a shunt, a current converter or a current former. In this way the welding process can be monitored during the emission of energy via the electrode, so that the quality of the welding can be improved.

The invention also comprises a method for emission of a plurality of energy pulses to a consumer disposed at a welding point. This method is achieved that during a welding cycle, a plurality of energy pulses from a plurality of energy stores are applied by successive activation of the switching devices associated therewith with a pre-settable duration in succession to the consumer, whereupon the energy stores are simultaneously or successively recharged with energy by at least one charging device. The advantage in this respect is that, due to the application of a plurality of successive energy pulses, exact control is possible over varying amplitudes and durations of the energy pulses, so that a considerably thicker additive material can be applied to the workpiece, or an exact adaptation of the welding process to the additive material is possible.

Also of advantage is that each energy pulse and the amplitude of the same can be adjusted by the input and/or output device or that the duration between two successive energy pulses may be respectively independently adjusted. Moreover it is advantageous that the duration of the low charging cycles can be adjusted independently of the charging time of the energy stores or that the duration over which the energy pulses are emitted to the consumer can be adjusted independently of the duration of the charging cycle. In this way an exact control of the configuration of a welding process is possible, so that the welding quality can be substantially increased.

The invention further comprises a method for emitting at least one energy pulse to a consumer located at a welding point, particularly for resistance welding, in which, by means of activation of a switching device, an energy stored in at least one energy store is applied in the form of an energy pulse to the consumer, particularly to a welding torch with non-melting electrodes and a workpiece, whereupon the energy store is again charged with energy via a charging device, particularly for use of a welding apparatus. This method is characterised in that, before a welding procedure, at least one pre-settable sensor pulse is applied to the consumer, the flowing current being measured during the sensor pulse by a sensor device, whereupon, on the basis of the detected current, the transitional resistance between the non-melting electrode and the workpiece is calculated by the control device. The advantage in this respect is that, due to determination of the transitional resistance between the electrode and the workpiece, the energy pulse required for the welding process can be co-ordinated to the transitional resistance, so that undesired fusion penetrations and welding spatter are prevented during the welding process.

Further advantages are that the amplitude magnitude and/or duration of the sensor pulse is established as smaller than that of the energy pulse or that the calculated transitional resistance is compared with a value stored in a memory of the control device, a warning signal for example being emitted when a predetermined tolerance range is deviated from or that, in accordance with the calculated transitional resistance, the energy pulse is established or corrected by the control device. Other embodiments are that the sensor pulse can have a positive or negative polarity or that the sensor pulse is emitted before each energy pulse, or before a welding cycle formed by a plurality of energy pulses. The advantages achievable thereby are to be seen in the detailed description of the Figures.

BRIEF DESCRIPTION OF THE DRAWINGS

The invention will be explained in more detail in the following with reference to the embodiments given by way of example and illustrated in the drawings, which show:

FIG. 6 a diagram of the charging and discharging cycle of the welding apparatus according to the invention according to FIG. 5;

FIG. 7 a further diagram of the charging and discharging cycle of the welding apparatus according to the invention, according to FIG. 5;

DETAILED DESCRIPTION OF PREFERRED EMBODIMENTS

It should be noted initially that in the embodiments variously described identical parts have been provided with identical reference numbers or identical component titles; the disclosures contained in the entire description can logically be transferred to identical parts with the same reference numbers or the same component titles. Also, the details of position selected in the description, such for example as above, below, lateral, etc., refer to the directly described or illustrated Figure and, upon a change in position, may logically transferred to the new position. Furthermore, individual features from the various illustrated embodiments may in themselves represent independent solutions according to the invention.

Figure 1:
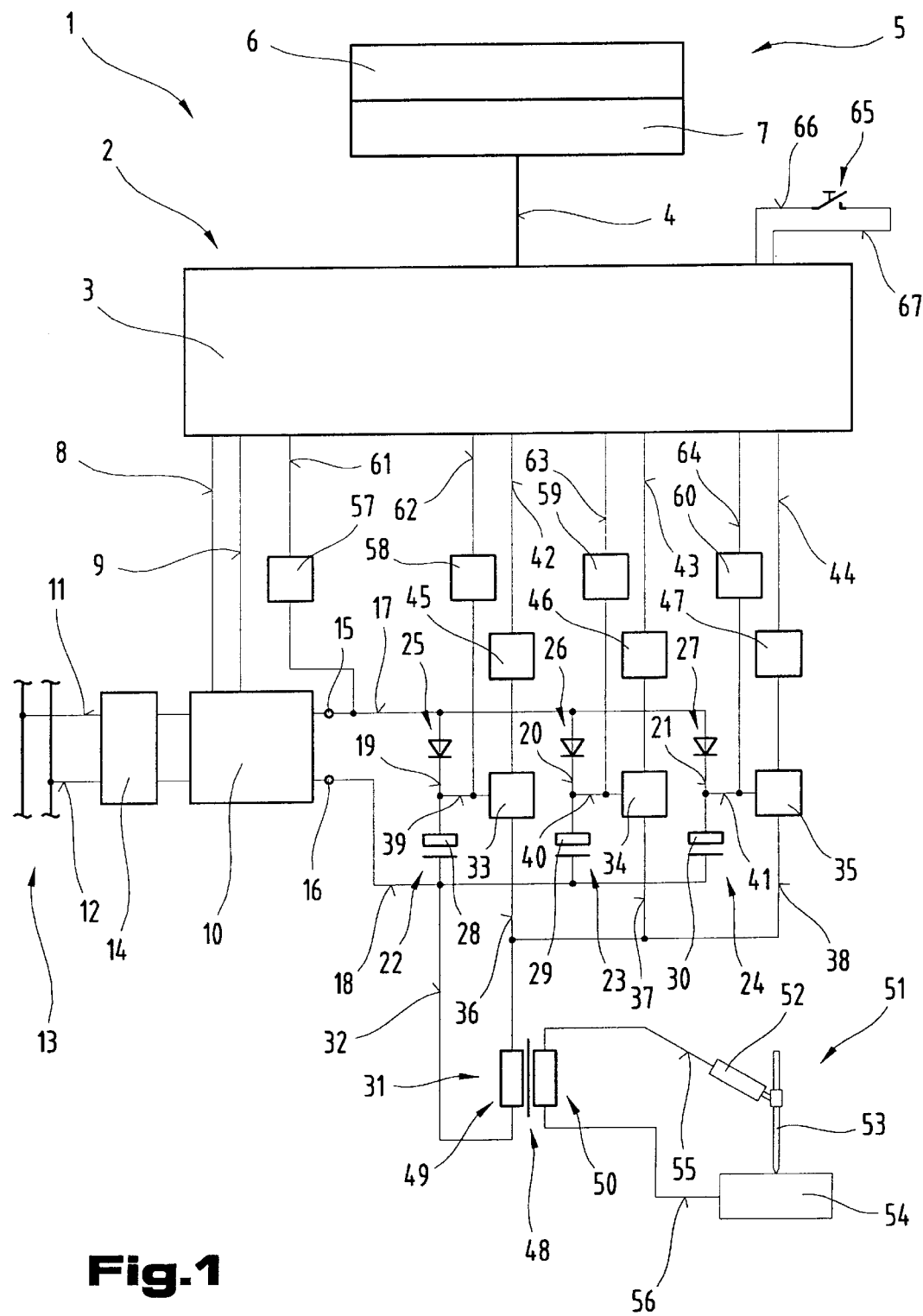
FIG. 1 a circuit diagram of welding apparatus according to the invention, in a simplified view.

FIG. 1 shows a block circuit diagram for a welding apparatus 1, according to the invention, particularly for a resistance welding apparatus. The welding apparatus 1 has a control device 2, in particular a microprocessor control system 3. The microprocessor control system 2 is formed by an internal memory and a plurality of inputs and/or outputs. Based in the internal memory is a software program necessary for microprocessor control 3, so that control of the individual inputs and/or outputs can be carried out by the microprocessor control system 3 via the software program.

Disposed on one of the inputs and/or outputs of the microprocessor control system 3 and via a conductor 4, is an input and/or output device 5. The input and/or output device 5 can in this case be formed from an LCD display 6 or a control panel 7. Basically it should be stated relating to the arrangement of the input and/or output device 5, that this latter is controlled via a plurality of conductors 4, although in the block diagram illustrated only one conductor 4 is shown for the input and/or output device 5 or for the LCD display 6 of the control panel 7. In this respect the LCD display 6 shows the conditions or predetermined values for a welding process taking place via the software program in the microprocessor control system 3. By means of the control panel 7, a user can influence several functions of the software program, i.e. by means of various switches or a keyboard, the welding apparatus 1 can be adapted to a specific welding process by the user. The user can set the most varied parameters, such for example as current value, for an imminent welding process.

The microprocessor control system 3 is connected via supply conductors 8, 9 to a charging device 10, so that the microprocessor control system 3 can be supplied with power via the charging device 10. Thus the charging device 10 can be formed by any current source belonging to prior art, for example by an inverter current source. Furthermore, the charge device 10 is connected by conductors 11, 12 to a mains voltage supply 13 with an interposed filter arrangement 14. The mains voltage supply 13 may in this respect be formed by the mains system of an electrical supply company or of a mobile current generator.

The charging device 10 has two outputs 15, 16 at each of which is arranged a charging conductor 17, 18. Energy stores 22 to 24 are connected to the charging conductor 17, 18 parallel to the outputs 15, 16 via conductors 19 to 21, so that the energy stores 22 to 24 are disposed parallel to the outputs 15, 16 of the charging device 10. Between the energy stores 22 to 24 and the charging conductor 17 are disposed diodes 25 to 27 in the passage direction to the energy stores 22 to 24, so that the positive potential is applied from the charging device 10 to the charging conductor 17, and the negative potential is applied to the charging conductor 18, and thus a circuit can be built up via the energy stores 22 to 24. The energy stores 22 to 24 may be formed by electrolytic capacitors 28 to 30. An advantageous factor in use of an electrolytic capacitor 28 to 30 as an energy store 22 to 24 is that rapid charging or discharging of the energy stored in the energy stores 22 to 24 or in the electrolytic capacitors 28 to 30 can be effected. Naturally it is possible for any energy store such for example as a battery to be used as an energy store 22 to 24.

An output of a transfer device 31 is connected via a conductor 32 to the charging conductor 18. The input of the transfer device 31 is respectively connected to one output of a switching device 33 to 35 associated with each energy store 22 to 24 via a conductor 36 to 38. The input of the switch devices 33 to 35 is respectively connected via a conductor 39 to 41 between the corresponding energy store 22 to 24 and the associated diodes 25 to 27 to the corresponding conductor 19 to 21, so that a respective current circuit can be built up with the energy stores 22 to 24 via the switch devices 33 to 35 and the transfer device 31.

In order that the switch devices 33 to 35 for the individual energy stores 22 to 24 may be precisely controlled, the switch devices 33 to 34 are connected with their control inputs via conductors 42 to 44, for example with an interposed photocoupler 45 to 47, to the input and/or outputs of the control device 2, particularly of the microprocessor control system, so that by activation of the corresponding input and/or outputs of the microprocessor control system 3, the switch devices 33 to 35 can be activated. The switch devices 33 to 35 may for example be formed from IGBT's, transistors, etc.

The transfer device 31 in this respect can be formed by a transformer 48 belonging to prior art with a primary coil 49 and a secondary coil 50. The transfer ratio of the transformer 48 in this case can lie between 1:20 and 1:80 preferably 1:50. The primary coil 49 is connected to the conductors 32 and 36 to 38, in contrast to which there is connected to the secondary coil 50 of the transformer 48 a consumer 51, particularly a welding torch 52 with a non-melting electrode 53, and a workpiece 54, i.e. by means of transferring the energy supplied by the energy stores 22 to 24 from the primary coil 49 to the secondary coil 50, the consumer 51 is supplied with power via conductors 55, 56, the positive potential being applied to the conductor 55 and the negative potential to the conductor 56.

In order now that control of the welding apparatus 1 may be carried out by the control device 2, particularly the microprocessor control system 3, various measuring devices 57 to 60, for example for monitoring the voltages of the individual components, are disposed over inputs and/or outputs of the microprocessor control system 3. The measuring devices 57 to 60 are connected via conductors 61 to 64 to the inputs and/or outputs of the control device 2. The conductor 61 is in this case connected to the charging conductor 17 in order to measure the charging voltage. The conductors 62 to 64 of the measuring devices 57 to 60 are connected to the conductors 39 to 41 in order to monitor the power circuit via the energy stores 22 to 24, discharge of the energy stores 22 to 24 being capable of monitoring via the individual measuring devices 57 to 60 by the control device 2, particularly the microprocessor control system 3. By means of the disposition of the measuring devices 58 to 60, the microprocessor control system 3 can carry out permanent monitoring of the conditions at the energy stores 22 to 24, so that if a fault occurs during the welding process or during the charging cycle, the microprocessor control system 3 can emit a signal so that the user is warned that a fault has occurred in the last welding process. Naturally, it is possible for the microprocessor control system 3 to display these faults at the LCD display 6.

It is further possible to connect a start switch 65 via conductors 66, 67 to the inputs and/or outputs of the control device 2. This start switch 65 is preferably located in the welding torch 52 so that, during use of the welding apparatus 1, the user can start a welding process by actuating the start switch 65.

The welding process can be carried out with the welding apparatus 2 after the said apparatus has been connected to the mains voltage supply 13. In addition, the user of the welding apparatus 1 can set the corresponding parameters, such for example as the extent of output power, the duration of an energy pulse and the pauses between the individual pulses.

After the user has set the individual parameters for the welding process, he can start a welding process via the start switch 65. The welding process for such a welding apparatus 1 is carried out in such a way that the user for example dips the electrode 53 into a metal powder, so that the metal powder adheres to the electrode 53. Then the user contacts the workpiece 54 with the electrode 53, so that by actuating the start switch 65 an energy pulse is sent from the welding apparatus 1 to the electrode 53, melting the workpiece 54 and the metal powder, so that a transfer of material is achieved between the additive material, particularly the metal powder and the workpiece 54.

Naturally it is possible to apply a corresponding additive material, such for example as steel sheet instead of a metal powder to the workpiece 54, whereupon the user applies the electrode 53 to the additive material and by actuating the start switch 65 again transmits an energy pulse from the electrode 53 to the workpiece 54, so that melting of the additive material is effected. In this respect it is possible for the user optionally to adjust the corresponding energy of the energy pulse, particularly of a current pulse or of a voltage pulse, so that the user can carry out an adaptation to the most varied additive materials or to the metal powder.

Emission of the energy pulse by the welding apparatus 1 according to the invention is effected in such a way that, by actuation of the start switch 65, the control device 2 is informed that a welding process is to be carried out. It is possible by single actuation of the start switch 65 to carry out only one welding process with a plurality of successive energy pulses applied to the electrode 53; in contrast to this, when the start switch 65 is permanently closed, a cycled operation can be selected by the user, i.e. permanent repetition of the welding process with a plurality of successive energy pulses. After the user has activated the start switch 65 or when the welding apparatus 1 is brought into operation, a pulse or signal is emitted, via one or a plurality of control lines not illustrated, by the microprocessor control system 3 to the charging device 10, the charging device 10 being informed that charging of the energy stores 22 or 24 is to be effected. Thereupon the charging device 10 applies energy to the charging conductors 17 and 18, so that the energy stores 22 to 24 are charged with the corresponding energy. It is possible, by setting a specific current value, correspondingly to charge the energy stores 22 to 24 with this value. In order however that a different charging of the energy stores 22 to 24 can be carried out, it is possible for the microprocessor control system 3 to emit via the control lines not shown a specific code in series, so that in accordance with this code the charging device 10 sets the corresponding energy for charging the energy stores 22 to 24. Naturally it is possible, instead of serial codes, to carry out a parallel connection with the microprocessor control system 3, by which means however a plurality of control lines must be disposed between the microprocessor control system 3 and the charging device 10, or due to the magnitude of a voltage signal at the control line, a corresponding charging of the energy stores 22 to 24 is effected.

After the energy stores 22 to 24 have been charged for a period calculated for the corresponding charging value or for a pre-set period, it is possible for the charging device 10 to emit a return signal, via a control line not shown, to the microprocessor control system 3, so that the microprocessor control system 3 can recognise that the energy stores 22 to 24 are fully charged. Thereupon the microprocessor control system 3 triggers the first switch 33 over a pre-settable period, so that by switching conductor 39 through to conductor 36, discharge of the energy store 22 is effected via the transfer device 31. Discharge of the energy store 22 via the transfer device 31 means that an electrolytically separate transfer is effected from the primary coil 49 to the secondary coil 50, and thus an energy pulse of the corresponding period is applied to the electrode 53. By applying the energy pulse to the electrode 53, the metal powder applied to the electrode 53 or the additive material added to the workpiece 54 is heated, so that a transfer of material is effected from the metal powder or the additive material to the workpiece 54.

After expiry of a specific pre-settable period, the microprocessor control system 3 accepts the signal from the conductor 42, so that the switch device 33 is deactivated.

Then, after expiry of a further predeterminable period, the microprocessor control system 3 triggers the further switch device 34 via the conductor 43, so that now the energy store 23 is discharged via the transfer device 31 and thus a renewed energy pulse is generated at the electrode 53. Thereupon the microprocessor control system 3 deactivates the switch device 34 and, after expiry of a pre-set period, triggers the further switch device 35, so that the third successive energy pulse is applied to the electrode 53. After all the energy stores 22 to 24 have been discharged via the transfer device 31 or the electrode 53, the microprocessor control system 3 again sends a signal via the control line to the charging device 10 so that renewed charging of the energy stores 22 to 24 is effected over a calculated or pre-set period. Naturally it is possible, during discharge of the individual energy stores 22 to 24, to effect simultaneous charging of these energy stores 22 to 24. This has the advantage that in this way more rapid charging of the individual energy stores 22 to 24 is achieved and thus the charging cycle can be shortened after emission of the stored energy of energy stores 22 to 24.

If now the user still has the start switch 65 in the active position, the microprocessor control system 3 is informed that cycled operation is to be carried out with the welding apparatus 1, i.e. that after charging of the energy stores 22 to 24, the energy stores 22 to 24 are to be repeatedly discharged via the transfer device 31 without additional actuation of the start switch 65. However, if the start switch 65 has been opened by the user, then after renewed charging of the energy stores 22 to 24, the welding process is interrupted.

In such a welding apparatus 1 it is possible for the user to set various conditions for emission of the energy pulses to the electrode 53. Thus it is possible for the user freely to set the magnitude of the current or voltage, the period, how long the energy pulse is to last, the period of the pauses between the successive energy pulses and the period of the charging cycle via the control panel 7, as shown in the following diagrams of FIGS. 2 to 4.

Figure 2:
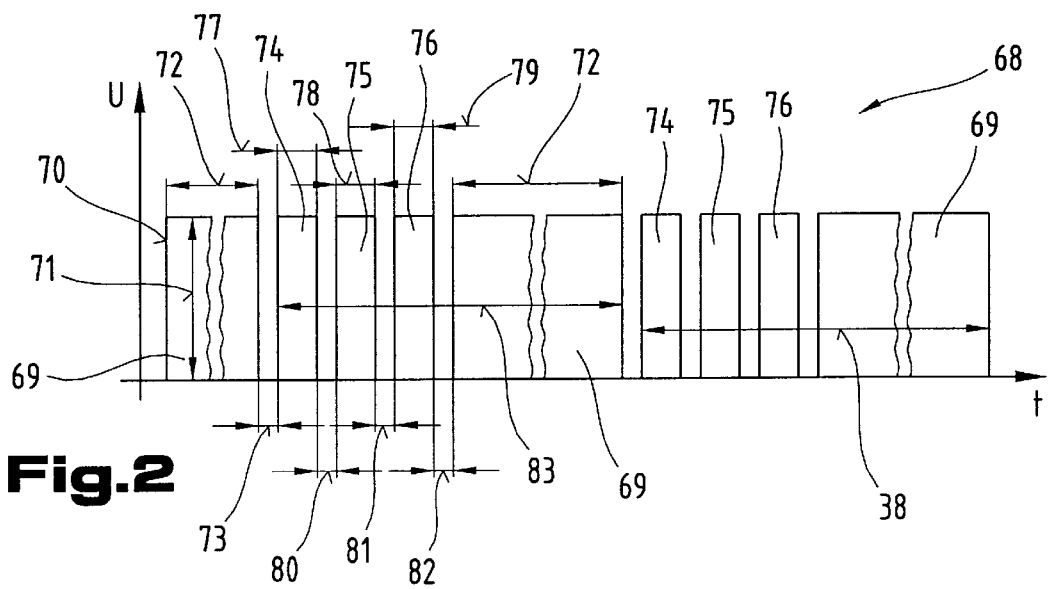
FIG. 2 a diagram of the charging cycle of the welding apparatus according to the invention according to FIG. 1.
Figure 3:
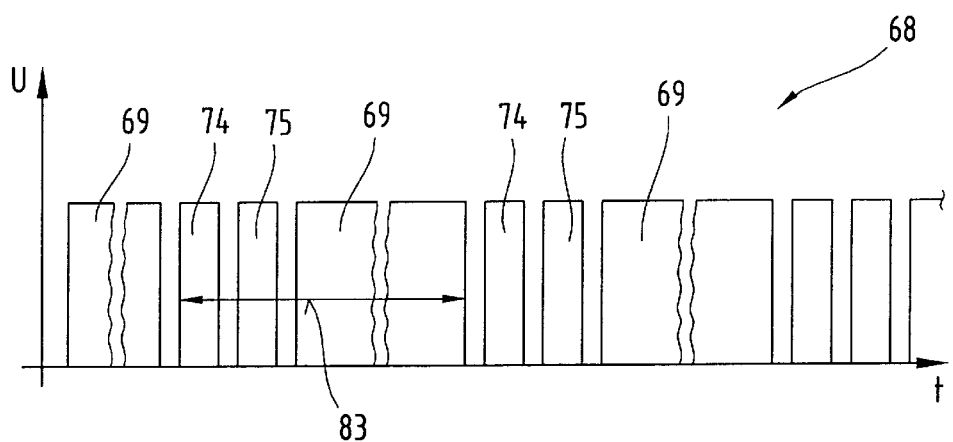
FIG. 3 a further diagram of the charging and discharging cycle of the welding apparatus according to the invention according to FIG. 1.
Figure 4:
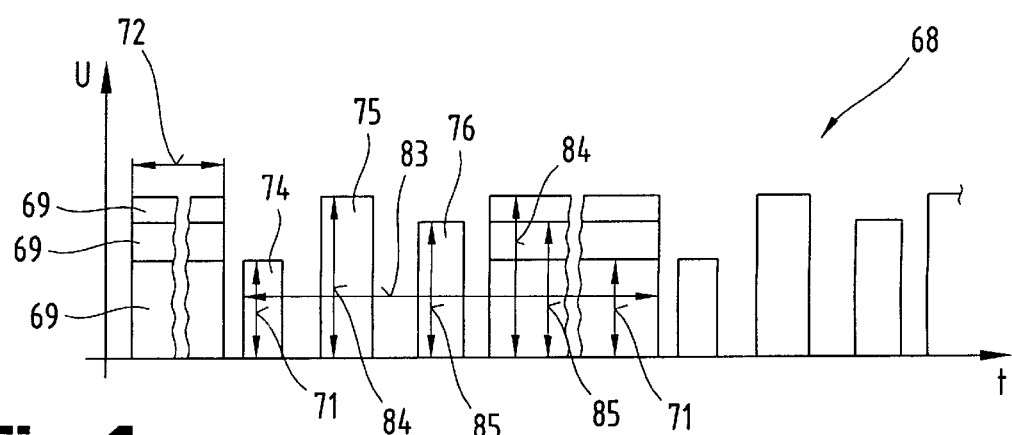
FIG. 4 another diagram of the charging and discharging cycle of the welding apparatus according to the invention according to FIG. 1.

From the illustrated diagrams of FIGS. 2 to 4 there is to be seen a welding process of the welding apparatus according to the invention shown by an output characteristic curve 68. Entered on the diagrams on the ordinate are the voltage U and on the abscissa the time t. The output characteristic curves 68 are measured directly at the outputs of the secondary portion, i.e. the secondary coil 50 of the transformer 48.

When the welding apparatus 1 is set in operation, i.e. upon connection of the charging device 10 to the voltage supply network 13, firstly the energy stores 22 to 24 can be charged by the charging device 10, so that the user can carry out a welding process with the welding apparatus 1 at any time. Naturally, it is possible that the energy stores 22 to 24 can be charged by the charging device 10 only after setting the individual parameters.

A charging cycle 69 is for example started at point in time 70 by the microprocessor control system 3 by activation of the control line. This charging cycle 69 has an amplitude 71 required for the following welding process, i.e. due to this magnitude of the amplitude 71 the energy stores 22 to 24 are charged with the same magnitude of amplitude. The charging procedure, particularly of the charging cycle 69, can be freely selected by the user via pre-settable time periods 72, or setting of the time period 72 can be independently calculated directly by the microprocessor control system 3 or by the charging device 10 on the basis of the noted amplitude 71. After expiry of the period 72, all the energy stores 22 to 24 are charged with the same energy potential, so that a welding process can be carried out by the user at any time.

It is however necessary to wait for a specific period 73 after termination of the charging cycle 69, before an energy pulse 74 is applied to the electrode 53. This is necessary because during this period 73 the charging device 10 transmits a signal to the microprocessor control system 3 in order to terminate the charging cycle 69. If the user has pressed the start switch 65, then after expiry of the period 73 a welding process can be carried out. For this purpose a plurality of energy pulses 74 to 76 is applied successively to the electrode 53 by actuation and deactivation of the switching devices 33 to 35. Thus the user again can freely set a period 77 to 79 of the individual energy pulses 74 to 76 and a period 80 to 82 of the pauses between the individual energy pulses 74 to 76 or between the last energy pulse 76 and the following charging cycle 69.

After the welding procedure is terminated, i.e. all three energy pulses 74 to 76 have been applied to the electrode 53, a renewed charging cycle 69 is carried out for the energy stores 22 to 24 so that a renewed welding procedure can be carried out.

It can now be stated that a welding procedure or a welding process lasts from the emission of the first energy pulse 74 until termination of the charging cycle 69. Thus it is possible for the user freely to set a period 83 lasting for the welding procedure, so that automatic calculation of the individual energy pulses 74 to 76 and of the various time periods 77 to 82 is carried out on the basis of a predetermined magnitude of the amplitude 71, by the microprocessor control system 3.

In cycled operation, after terminating the welding procedure, i.e. after expiry of the period 83, a further welding procedure is started, so that continuous welding can be carried out with the welding apparatus 1. Naturally it is possible that only individually welding procedures can be selected by the user of a period 83, so that between the beginning of a welding procedure with the period 83 and a renewed welding procedure, again with the same or a different period 83, a longer pause can remain between. In this case it is however necessary for the energy stores 22 to 24 to be kept permanently at the same energy value, so that continuous charging, i.e. maintenance of the energy in the energy stores 22 to 24, is carried out by the charging device 10, which is interrupted only on activation of the starting switch 65 and after termination of period 73, the welding procedure is started. The user also has the opportunity to adjust the number of successive welding procedures with period 83 so that, after all welding procedures or welding processes have been carried out, the welding procedure is automatically terminated by the control device 2. It is also possible to select the number of successive energy pulses 74 to 76.

As may be better seen from FIG. 3, it is possible for the user of the welding apparatus 1 to select a welding procedure with the period 83 in such a way that, instead of three energy pulses 74 to 76, only two energy pulses 74, 75 are emitted, in this case again all the parameters indicated for this output characteristic curve 68 being freely selectable by the user via the control panel 7.

As FIG. 4 shows, it is also possible to establish different amplitudes 71, 84, 85 and different time periods 77 to 82 for the most varied energy pulses 74 to 76. The period 83 of the welding procedure is in this case established by the user himself or by the microprocessor control system 3. With such a design of the welding apparatus 1 it is however necessary for each energy store 22 to 24 to have its own charging device 10, so that independent charging of the energy stores 22 to 24 can be carried out by the individual charging devices 10 with the corresponding amplitudes 71, 84, 85.

Naturally, it is possible, instead of two or three energy pulses 74 to 76, to apply further energy pulses 74 to 76, for example four to six energy pulses 74 to 76 within the period 83 to the electrode 53 for a welding procedure. In this case however it is necessary to dispose for each energy pulse 74 to 76 its own energy store 22 to 24 in the welding apparatus 1. It is then also necessary for various amplitudes 71, 84, 85 to be freely adjustable by the user, and thus again a separate charging device 10 must be provided for each energy store 22 to 24.

It is however also possible to charge the energy stores 22 to 24 with different amplitudes 71, 84, 85 with only one charging device 10, in which case the charging device 10 must then be so designed that the output of the charging device can be automatically switched over to the individual energy stores 22 to 24, i.e. the energy stores 22 to 24 are not disposed parallel to one another, but these are charged successively by the charging device 10 via a switching device disposed in the charging device 10.

It is also possible to dispose a further switching device between the energy stores 22 to 24 and the diodes 25 to 27, so that by successive activation of the switching devices, serial charging of the energy stores 22 to 24 with different amplitudes 71, 84, 85 can be carried out by the charging device 10.

It is advantageous in such a welding apparatus 1, that by means of disposing a plurality of energy pulses 74 to 76 in one welding procedure, i.e. in the period 83, a greater melting of the additive material is achieved, as by means of the directly successive emission of the energy pulses 74 to 76 the additive material is more intensely heated so that, compared to a resistance welding apparatus known from prior art, thicker additive material or coarser metal powder can be used.

It is further possible, by means of the arrangement of a plurality of successive energy pulses 74 to 76 through different amplitudes 71, 84, 85 to carry out a precise adaptation to the additive material. In this respect it is advantageous that for example pre-heating of the additive material is activated with the energy pulse 74, i.e. the amplitude 71 is selected to be below the melting point of the additive material, in contrast to which the further energy pulse 75 is emitted at an amplitude 84 which lies above the melting point of the additive material, so that a transfer of material is achieved with the energy pulse 75, and with the following energy pulse 76 slow cooling of the additive material is possible by in turn setting the amplitude 85 beneath the melting point of the additive material, so that a perfect transfer of material is provided between the workpiece 54 and said additive material.

With the welding apparatus 1 described and the associated method, it is also possible, during operation of the welding apparatus 1, for the user to alter the desired current value for the welding process at any time. If the energy stores 22 to 24 in this case are charged to a specific value, and if the user sets a desired current value beneath this value, then the energy stores 22 to 24 are discharged by a discharge circuit belonging to prior art and not illustrated, and then recharged to the new desired current value. Naturally it is possible that the energy stores 22 to 24 may not be totally discharged, but are only discharged until the stored energy coincides with the new desired current value. If however the user increases the set desired current value, the energy stores 22 to 24 are further charged by increase in energy by the charging device 10, so that identity with the new desired current value is established.

Naturally it is possible for the energy stores 22 to 24 to be only partially discharged in accordance with a predetermined required value, for which purpose monitoring of the discharging procedure is effected by the measuring devices 58 to 60.

It is also possible for the microprocessor control system automatically to calculate the further parameters for a welding procedure by setting only the desired current value, i.e. the microprocessor control system 3 independently establishes or calculates the periods 77 to 79 of the energy pulses 74 to 76, the period 73, 80 to 82 of the pauses between the energy pulses 74 to 76 and the period 72 for the charging cycle 69; individual parameters, however, may then still be altered by the user. In this respect it is also possible then, after alteration of individual parameters, for a new calculation to be carried out by the microprocessor control system 3.

Figure 5:
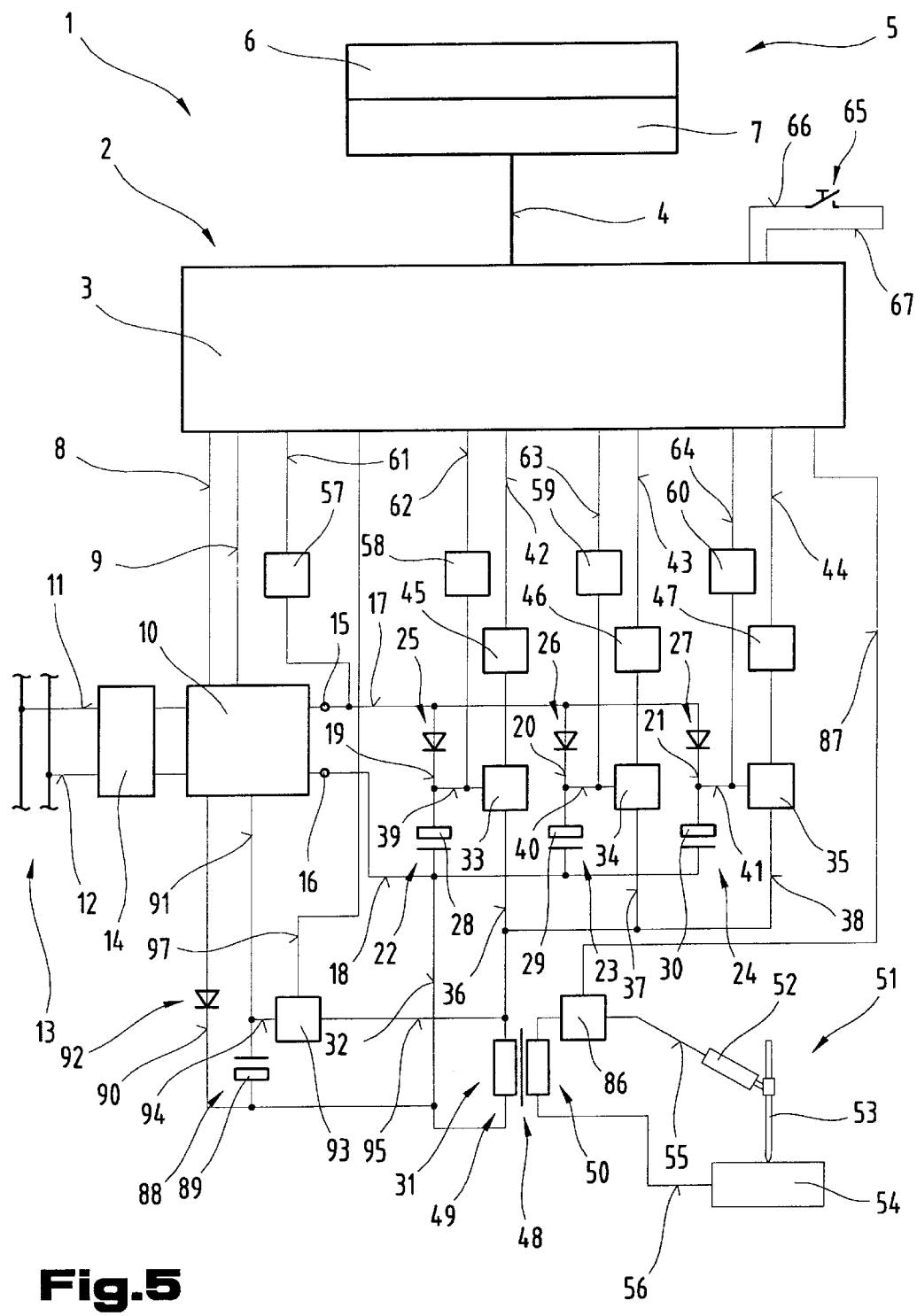
FIG. 5 a further embodiment of a circuit diagram of the welding apparatus according to the invention, in a simplified view.

FIGS. 5 to 7 show a further variant construction of the welding apparatus 1 according to the invention, the same reference numbers being used for the same parts of the Figures described above.

FIG. 5 shows a circuit diagram of the welding apparatus 1 according to the invention, while in FIGS. 6 and 7 there are respectively shown differing process configurations for the welding apparatus 1.

The difference from the welding apparatus 1 described in FIG. 1 now resides in the fact that a sensor device 86 is interposed between the transfer device 31, i.e. the transformer 48 and the welding torch 52, particularly the electrode 53. The sensor device 86 is connected by a conductor 87 to the control device 2, particularly the microprocessor control system 3. The function of the sensor device 86 resides in measuring the current flowing in the conductor 55 by the sensor device 86, and then passing it via conductor 87 to the control device 2. The sensor device 86 may for example be formed by a shunt, a current converter or a current former.

In addition, the welding apparatus 1 has for example a further energy store 88, which again can be in the form of an electrolytic capacitor 89. The energy store 88 is again connected by conductors 90, 91 to the charging device 10. In the embodiment shown, the charging device 10 is now so designed that two different charging procedures can be carried out by the charging device 10, i.e. for example the energy store 88 is charged with energy different from that of the energy stores 22 to 24, which are used for the welding procedure in order to form the energy pulses 74 to 76. In addition, a further diode 92 is located between the energy store 88 and the charging device 10.

In order that the energy store 88 can be discharged via the transfer device 31, a further switch device 93 is provided for the energy store 38, said switch device 93 being connected by a conductor 94 to the conductor 91, in particular to the transformer 48 and via a further conductor 95 to conductor 36. The positive potential of the energy store 88 is connected via a conductor 96 to conductor 32, particularly to the transformer 48. In order that the switch device 93 can be triggered by the control device 2, the switch device 93 is connected by a control line 97 to the control device 2.

By means of such an arrangement of the energy store 88 it is now possible, when the switch device 93 is triggered by the control device 2, for the energy stored in the energy store 88 to be discharged via the transfer device 31, as already explained in the Figures described above. The energy store 88 is connected to the transfer device 31 in such a way that the said energy store, during discharge via the transfer device 31, has the opposite polarity from the energy stores 22 to 24, i.e. during discharge of the energy store 88 a negative pulse is applied to the electrode 53, in contrast to which during discharge of the energy stores 22 to 24 a positive pulse is applied to the electrode 53. The advantage of a negative pulse resides in the fact that this pulse can be used to de-magnetise the transformer 48, so that a smaller transformer 48, for example without air-gap, can be used for such a welding apparatus 1.

The pulse generated via the energy store 88 is a sensor pulse 98, as shown in FIGS. 6 and 7. This sensor pulse 98 has the task of determining the transitional resistance between the electrode 53 and the workpiece 54. This occurs in that, before a welding procedure or before at least one of the energy pulses 74 to 76, at least one sensor pulse 98 is emitted. The sensor pulse 98 has a lower amplitude magnitude or period compared to the energy pulses 74 to 76. By means of applying the sensor pulse 98 with a pre-settable amplitude magnitude a situation is achieved in which the current flowing through the conductor 55 is detected by the sensor device 86. Thereupon the measured current flow is passed by the sensor device 86 to the control device 2, so that, due to the amplitude magnitude and the measured current flow, the transitional resistance between the electrode 53 and the workpiece 54 can be calculated. Naturally it is possible for the sensor pulse 98 to have the same polarity as the energy pulses 74 to 76.

FIG. 6 illustrates a procedure for a welding process in which, before emission of at least one of the energy pulses 74 to 76, the sensor pulse 98 is emitted. By means of detection of the transitional resistance it is now possible for the control device 2 to adapt the energy pulses 74 to 76 to the detected transitional resistance, i.e. for example the detected transitional resistance is compared with a value stored in a memory of the control device 2, and if it deviates outwith a specific tolerance range, the stored energy of the pre-set energy pulses 74 to 76 is adapted to the detected transitional resistance, or a warning signal is emitted by the welding apparatus 1, particularly by the control device 2.

After the welding procedure, i.e. after emission of the individual energy pulses 74 to 76 or the sensor pulse 98, a charging cycle is carried out for the individual energy stores 22, 24 and 88, so that a sensor pulse 98 or the individual energy pulses 74 to 76 can again be emitted for a new welding procedure.

In the flow diagram shown in FIG. 7 of a method for a welding apparatus 1, its own sensor pulse 98 is emitted before each energy pulse 74 to 76. The advantage resides in the fact that in this way, upon alteration of the transitional resistance which is detected by the sensor pulse 98, the control device 2 can emit a warning signal, or the welding procedure can be interrupted before emission of the next energy pulse 74 to 76, so that fusion penetrations or welding spatter at the welding point can be avoided.

In such a welding apparatus 1, particularly in a resistance welding apparatus 1, the function of a welding process is based on the fact that a specific transitional resistance must be present at the welding point between electrode 53 and workpiece 54. The magnitude of the transitional resistance is dependent on the materials used, such for example as the electrode 53, the welding additive material, the material of the workpiece 54, the surface quality of the workpiece 54, the transitional surface and the applied pressure of the electrode 53 against the workpiece 54. These various magnitudes of a welding process can be pre-set via the input or output device 5, so that a sensor pulse 98 adapted in accordance with the individual materials can be generated. This is possible in that charging of the energy store 88 via the charging device 10 can be controlled by transmission of a corresponding desired value by the control device 2.

The quality of a weld is determined by the degree of melting of the additive material, particularly of the welding additive material, and the workpiece 54, i.e. by means of application of an energy pulse 74 to 76 to the welding point, i.e. to the electrode 53, a welding current results in dependence on the transitional resistance between the electrode 53 and the workpiece 54, which heats the welding point and causes melting of the welding additive material with the workpiece 54. If for example this transitional resistance is too small, no melting of the welding additive material with the workpiece 54 occurs, whilst if the transitional resistance is too high, evaporation or combustion of the welding additive material can occur, so that undesired fusion penetrations or welding spatter can occur at the welding point of the workpiece 54 and/or of the welding additive material.

By means of emission of the sensor pulse 98 it is now possible to determine the transitional resistance between the electrode 53 and the workpiece 54; for this reason the sensor pulse 98 is emitted before the actual energy pulses 74 to 76. In this case the amplitude and/or period of the sensor pulse 98 is smaller than that of the energy pulses 74 to 76. In this case the sensor pulse 98 should be of such dimensions that no melting of the welding additive material or of the workpiece 54 occurs.

During emission of the sensor pulse 98, the current flowing through conductor 55 or electrode 53 is measured by the sensor device 86 and forwarded over conductor 87 to the control device 2. The control device 2 can now calculate the transitional resistance at the weld point, particularly at electrode 53, to the workpiece 54 from this measurement by the sensor device 86.

After the transitional resistance has been calculated by the control device 2, the said control device compares the calculated transitional resistance with a value deposited in a memory. It is also possible to store a plurality of different values in dependence on different settings of the welding apparatus 1 in a memory. If the determined transitional resistance at a corresponding setting lies within a specific tolerance range, the control device 2 starts the welding process, emitting energy pulses 74 to 76, as already described in FIGS. 1 to 4.

If however the transitional resistance lies outwith the predefined tolerance range, then is it possible for the control device 2 to emit a warning signal, the welding procedure being simultaneously interrupted or emission of the energy pulses 74 to 76 being blocked. Naturally it is possible for the energy pulses 74 to 76 to be adapted to the transitional resistance, i.e. for example the amplitude magnitude and/or the duration of the energy pulses 74 to 76 can be altered by the control device, i.e. for example the energy stores 22 to 24 are discharged via a discharge device belonging to prior art or only a restricted emission of the stored energy of the energy stores 22 to 24 is carried out. By means of adaptation of the energy pulses 74 to 76, a current corresponding to the transitional resistance flows through the electrode 53, so that the occurrence of fusion penetration or welding spatter at the welding point is prevented.

It is also possible, in order to restrict an excessively high current flow, to dispose a current limiting device in the welding apparatus 1, so that by corresponding triggering of the current limiting device only a specific current flow at a corresponding magnitude can occur through the electrode 53.

It would also be possible, in place of the sensor device 86 in the conductor 55, to carry out monitoring of the primary current circuit, i.e. in conductor 32. For this purpose however, for calculation of the transitional resistance during a measurement of the primary current of the transformer 48, the magnetising current of the transformer 48 must also be taken into account.

Finally, as a matter of order, it should be pointed out that individual components and sub-assemblies have been illustrated only schematically for improved understanding of the invention.

Individual features of the individual embodiments may, in conjunction with other individual features of other embodiments, or on their own, form the subject-matter of independent inventions.

Above all, the individual embodiments illustrated in FIGS. 1; 2 to 4; 5 to 7 can form the subject-matter of independent solutions according to the invention. The objects and achievements according to the invention in this respect are to be seen in the detailed descriptions of these Figures.

| List of reference numbers | |
|---|---|
| 1 | welding apparatus |
| 2 | control device |
| 3 | microprocessor control system |
| 4 | conductor |
| 5 | input and/or output device |
| 6 | LCD display |
| 7 | control panel |
| 8 | supply line |
| 9 | supply line |
| 10 | charging device |
| 11 | conductor |
| 12 | conductor |
| 13 | voltage supply network |
| 14 | filter arrangement |
| 15 | output |
| 16 | output |
| 17 | charging conductor |
| 18 | charging conductor |
| 19 | conductor |
| 20 | conductor |
| 21 | conductor |
| 22 | energy store |
| 23 | energy store |
| 24 | energy store |
| 25 | diode |
| 26 | diode |
| 27 | diode |
| 28 | electrolytic capacitor |
| 29 | electrolytic capacitor |
| 30 | electrolytic capacitor |
| 31 | transfer device |
| 32 | conductor |
| 33 | switching device |
| 34 | switching device |
| 35 | switching device |
| 36 | conductor |
| 37 | conductor |
| 38 | conductor |
| 39 | conductor |
| 40 | conductor |
| 41 | conductor |
| 42 | conductor |
| 43 | conductor |

| List of reference numbers -continued | |
|---|---|
| 44 | conductor |
| 45 | photocoupler |
| 46 | photocoupler |
| 47 | photocoupler |
| 48 | transformer |
| 49 | primary coil |
| 50 | secondary coil |
| 51 | consumption |
| 52 | welding torch |
| 53 | electrode |
| 54 | workpiece |
| 55 | conductor |
| 56 | conductor |
| 57 | measuring device |
| 58 | measuring device |
| 59 | measuring device |
| 60 | measuring device |
| 61 | conductor |
| 62 | conductor |
| 63 | conductor |
| 64 | conductor |
| 65 | starting switch |
| 66 | conductor |
| 67 | conductor |
| 68 | output characteristic curve |
| 69 | charging cycle |
| 70 | point in time |
| 71 | amplitude |
| 72 | duration |
| 73 | duration |
| 74 | energy pulse |
| 75 | energy pulse |
| 76 | energy pulse |
| 77 | duration |
| 78 | duration |
| 79 | duration |
| 80 | duration |
| 81 | duration |
| 82 | duration |
| 83 | duration |
| 84 | amplitude |
| 85 | amplitude |
| 86 | sensor device |
| 87 | conductor |
| 88 | energy store |
| 89 | electrolytic capacitor |
| 90 | conductor |
| 91 | conductor |
| 92 | diode |
| 93 | switching device |
| 94 | conductor |
| 95 | conductor |
| 96 | conductor |
| 97 | control line |
| 98 | sensor pulse |

What is claimed:

1. A resistance welding apparatus, comprising:
a consumer including an electrode, the electrode being operable to be supplied with electrical current so as to perform a welding operation upon a workpiece;
a transformer having an output side connected to the consumer;
a plurality of welding energy stores connected to an input side of the transformer for supplying current from each said energy store to the consumer, the welding energy stores all supplying current of the same predetermined polarity;
an additional energy store connected to the input side of the transformer for supplying current to the consumer;
a charging device coupled to the welding energy stores and to the additional energy store;
switching devices coupled with the welding energy stores and the additional energy store so as to enable a selected one of the energy stores to be at least partially discharged to supply current to the consumer independently of the other energy stores;

a sensor connected between the transformer and the consumer and operable to detect current flowing to the consumer; and a control device connected with the switching devices and operable to trigger the switching devices between two charging cycles for directly successive supply of current pulses from each of the energy stores to the consumer, the control device being connected with the sensor so as to detect the current flowing to the consumer from the additional energy store, the control device being operable to control operation of the welding energy stores based on the current detected by the sensor;

the additional energy store supplying current having a polarity opposite to the predetermined polarity of the welding energy stores, whereby the current pulse from the additional energy store at least partially demagnetizes the transformer.

2. The welding apparatus of claim 1, wherein each energy store has its own charging device.

3. The welding apparatus of claim 1, wherein the charging device is connected to the energy stores via switching devices so as to enable each energy store to be charged by the charging device independently of the other energy stores.

4. The welding apparatus of claim 1, wherein one of an input device and an output device is connected to the control device.

5. The welding apparatus of claim 1, wherein the charging device is connected to a voltage source via a filter arrangement interposed therebetween.

6. The welding apparatus of claim 1, further comprising a starting switch connected to the control device and operable to cause the control device to activate a welding procedure.

7. The welding apparatus of claim 1, wherein the sensor comprises one of a shunt, a current converter, and a current former.

8. A method of supplying current to a resistance welding consumer in a welding apparatus of the type in which an output side of a transformer is connected to the consumer and an input side of the transformer is supplied with current of a predetermined polarity, the method comprising:

supplying a sensor pulse of current to the input side of the transformer, the sensor pulse having a polarity opposite to said predetermined polarity;

measuring the current flowing from the output side of the transformer to the consumer upon application of the sensor pulse of current;

supplying one or more welding pulses of current to the input side of the transformer for performing a welding operation, the welding pulses being of said predetermined polarity; and controlling at least one of the amplitude and duration of the one or more welding pulses based on the measured current.

9. The method of claim 8, wherein at least one of the amplitude and duration of the sensor pulse is smaller than that of the welding pulses so as to avoid melting of a workpiece or an additive material upon application of the sensor pulse.

10. The method of claim 8, wherein controlling the welding pulses includes calculating a transitional resistance between the consumer and a workpiece based on the current measured upon application of the sensor pulse, and controlling the welding pulses based on the transitional resistance.

11. The method of claim 10, further comprising comparing the calculated transitional resistance with a predetermined value and providing a warning signal when the calculated transitional resistance is outside of a predetermined tolerance of the predetermined value.

12. The method of claim 8, wherein the sensor pulse is emitted prior to a welding operation in which at least one welding pulse is emitted.

13. The method of claim 8, wherein a series of welding pulses are emitted, and a sensor pulse is emitted prior to each of the welding pulses in the series.

14. The method of claim 8, wherein a series of welding pulses are emitted for a single welding operation, and wherein at least one of an amplitude of each welding pulse, a duration of each welding pulse, and an elapsed time between successive welding pulses is controlled based on the measured current.

* * * * *